(12) United States Patent
Oshima

(10) Patent No.: US 10,630,946 B2
(45) Date of Patent: Apr. 21, 2020

(54) PROJECTION TYPE DISPLAY DEVICE, DISPLAY CONTROL METHOD OF PROJECTION TYPE DISPLAY DEVICE, AND PROGRAM

(71) Applicant: FUJIFILM Corporation, Tokyo (JP)

(72) Inventor: Hiroyuki Oshima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/372,426

(22) Filed: Apr. 2, 2019

(65) Prior Publication Data

US 2019/0230328 A1 Jul. 25, 2019

Related U.S. Application Data

(63) Continuation of application No. PCT/JP2017/032540, filed on Sep. 8, 2017.

(30) Foreign Application Priority Data

Oct. 6, 2016 (JP) .................. 2016-198340

(51) Int. Cl.
*H04N 9/31* (2006.01)
*G02B 27/01* (2006.01)
(Continued)

(52) U.S. Cl.
CPC ........... *H04N 9/3147* (2013.01); *B60K 35/00* (2013.01); *B60Q 9/00* (2013.01); *G02B 27/01* (2013.01);
(Continued)

(58) Field of Classification Search
None
See application file for complete search history.

(56) References Cited

U.S. PATENT DOCUMENTS

2009/0160736 A1* 6/2009 Shikita ............... G02B 27/0101
345/7
2013/0057832 A1* 3/2013 Akiyama ........... G03B 21/2073
353/20
(Continued)

FOREIGN PATENT DOCUMENTS

JP H02114027 4/1990
JP H10293264 11/1998
(Continued)

OTHER PUBLICATIONS

"Augmented reality and representation in vehicle for safe driving at night", by Byoung-Jun Park, Jeong-Woo Lee, Changrak Yoon, and Kyong-Ho Kim, 2015 International Conference on Information and Communication Technology Convergence (Ictc), Oct. 2015, pp. 1261-1263. (Year: 2015).*

(Continued)

*Primary Examiner* — James A Thompson
(74) *Attorney, Agent, or Firm* — JCIPRNET

(57) ABSTRACT

Provided are a projection type display device, a display control method thereof, and a display control program thereof capable of preventing missing of warning information even in a case where display of warning information using a virtual image and display of warning information using a real image are switched. During a low speed run, warning information A1 is displayed on a windshield 6 using a real image Ir, and guidance information G1 is displayed in front of the windshield 6 using a virtual image Iv. During a high speed run, warning information A2 is displayed in front of the windshield 6 using the virtual image Iv, and guidance information G2 is displayed on the windshield 6 using the real image Ir.

12 Claims, 9 Drawing Sheets

(51) Int. Cl.
  *B60Q 9/00* (2006.01)
  *B60K 35/00* (2006.01)
(52) U.S. Cl.
  CPC ......... *G02B 27/0101* (2013.01); *H04N 9/312* (2013.01); *B60K 2370/1529* (2019.05); *B60K 2370/167* (2019.05); *B60K 2370/176* (2019.05); *B60K 2370/178* (2019.05); *B60K 2370/1876* (2019.05); *B60K 2370/52* (2019.05); *G02B 2027/0141* (2013.01)

(56) References Cited

U.S. PATENT DOCUMENTS

| | | | | |
|---|---|---|---|---|
| 2016/0152184 | A1* | 6/2016 | Ogawa | G02B 27/0101 345/589 |
| 2016/0167514 | A1* | 6/2016 | Nishizaki | G02B 27/0101 345/7 |
| 2017/0053444 | A1* | 2/2017 | Huang | G06T 19/006 |
| 2018/0118224 | A1* | 5/2018 | Arita | B60H 1/00564 |
| 2019/0137759 | A1* | 5/2019 | Hirata | B60K 35/00 |
| 2019/0196188 | A1* | 6/2019 | Hirata | G02B 5/10 |
| 2019/0265468 | A1* | 8/2019 | Hirata | G02F 1/13363 |

FOREIGN PATENT DOCUMENTS

| | | |
|---|---|---|
| JP | 2005041381 | 2/2005 |
| JP | 2007145310 | 6/2007 |
| JP | 2015054599 | 3/2015 |
| JP | 2015054628 | 3/2015 |
| JP | 2016101805 | 6/2016 |

OTHER PUBLICATIONS

"International Search Report (Form PCT/ISA/210) of PCT/JP2017/032540," dated Dec. 5, 2017, with English translation thereof, pp. 1-4.

"Written Opinion of the International Searching Authority (Form PCT/ISA/237) of PCT/JP2017/032540," dated Dec. 5, 2017, with English translation thereof, pp. 1-14.

"Office Action of Japan Counterpart Application," with English translation thereof, dated Jul. 16, 2019, p. 1-p. 11.

* cited by examiner

PROJECTION TYPE DISPLAY DEVICE, DISPLAY CONTROL METHOD OF PROJECTION TYPE DISPLAY DEVICE, AND PROGRAM

CROSS REFERENCE TO RELATED APPLICATION

This is a continuation of International Application No. PCT/JP2017/032540 filed on Sep. 8, 2017, and claims priority from Japanese Patent Application No. 2016-198340 filed on Oct. 6, 2016, the entire disclosures of which are incorporated herein by reference.

BACKGROUND OF THE INVENTION

1. Field of the Invention

The present invention relates to a projection type display device, a display control method of the projection type display device, and a computer readable medium.

2. Description of the Related Art

A vehicle head-up display (HUD) that projects, using a windshield in a variety of vehicles such as an automobile, a train, a ship, heavy equipment, an aircraft, or an agricultural machine, or a combiner disposed in the vicinity of the windshield as a screen, light onto the screen to display an image is known (see JP1998-293264A (JP-H10-293264A), JP2016-101805A, JP2015-054599A, JP2015-054628A, and JP2005-041381A). According to the HUD, it is possible to cause a driver to visually recognize an image indicating information for driving assistance as a real image on a screen or a virtual image in front of the screen.

JP1998-293264A (JP-H10-293264A) discloses an HUD that includes a unit for displaying a virtual image and a unit for displaying a real image. The HUD displays different kinds of driving assistance information in the virtual image and the real image, and displays entire driving assistance information using a real image in a situation where a virtual image is not easily seen.

JP2016-101805A discloses an HUD capable of preventing, even in a case where a real image and a virtual image are simultaneously displayed in a direction of a windshield, the real image and the virtual image from being superimposed.

JP2015-054599A discloses an HUD that includes two units for displaying a first virtual image and a second virtual image, and a unit for displaying a real image. The HUD displays a captured image outside a vehicle as the first virtual image, displays information on the vehicle as the second virtual image, and displays a warning or entertainment-related information as the real image.

JP2015-054628A discloses an HUD that displays vehicle status information as a real image to be viewed by both of a driver and a passenger, and displays information about a manipulation of a vehicle as a virtual image to be viewed by only the driver.

JP2005-041381A discloses an HUD capable of displaying a virtual image and a real image using one liquid crystal, in which the virtual image is viewed by a driver and the real image is viewed by a passenger.

SUMMARY OF THE INVENTION

Since a virtual image is visually recognized at a distant position with reference to a projection position of image light when seen from a driver, the virtual image is effective in a situation where it is necessary to adjust a focus of the driver relatively far. On the other hand, since a real image is visually recognized in the vicinity of the projection position of the image light, the real image is effective in a situation where it is necessary to adjust the focus of the driver relatively closely. Accordingly, it is considered that it is effective to dividedly use the virtual image and the real image as necessary.

In the HUDs disclosed in JP2016-101805A, JP2015-054599A, JP2015-054628A, and JP2005-041381A, driving assistance is performed using both of a virtual image and a real image. However, since focus positions of a driver are different in the virtual image and the real image, in a case where the virtual image and the real image are mixed, in a case where important information such as warning information is displayed in the virtual image or the real image, there is a concern that the driver does not notice the information.

Further, in the HUD disclosed in JP1998-293264A (JP-H10-293264A), driving assistance is performed for a driver only using a real image in a situation where the virtual image is not easily seen, but in this case, a virtual image display is suddenly switched to a real image display. Here, the focus of the driver is disposed far, in a case where warning information is displayed as a real image, there is a concern that the driver misses the warning information without noticing the display switch.

Further, in the HUD disclosed in JP2005-041381A, driving assistance is performed for a driver only using a virtual image, but there is a case where it is appropriate to perform driving assistance using a real image according to running statuses.

In consideration of the above-mentioned problems, an object of the invention is to provide a projection type display device, a display control method of the projection type display device, and a non-transitory computer readable medium storing a display control program of the projection type display device capable of preventing missing of warning information even in a case where display of warning information using a virtual image and display of warning information using a real image are switched.

According to an aspect of the invention, there is provided a projection type display device that is mounted in a vehicle, including: a virtual image display unit that includes a first light modulator that spatially modulates light that is emitted from a light source on the basis of input first image data and a first projection optical system that projects the spatially modulated light onto a projection surface of the vehicle to display a virtual image based on the first image data; a real image display unit that includes a second light modulator that spatially modulates light that is emitted from a light source on the basis of input second image data and a second projection optical system that projects the spatially modulated light onto a projection surface of the vehicle to display a real image based on the second image data; a first controller that controls the first image data to be input to the first light modulator; and a second controller that controls the second image data to be input to the second light modulator, in which the first controller inputs, as the first image data, guidance information including an arrow for guiding a line of sight to the real image displayed by the real image display unit to the first light modulator, in a case where the second image data includes warning information for providing a warning to a driver of the vehicle, and in which the second controller inputs, as the second image data, guidance information including an arrow for guiding the line of sight to the virtual image displayed by the virtual image display unit to the second light modulator, in a case where the first image data includes the warning information.

According to another aspect of the invention, there is provided a display control method of a projection type display device that is mounted in a vehicle, the projection type display device including a virtual image display unit that includes a first light modulator that spatially modulates light that is emitted from a light source on the basis of input first image data and a first projection optical system that projects the spatially modulated light onto a projection surface of the vehicle to display a virtual image based on the first image data, and a real image display unit that includes a second light modulator that spatially modulates light that is emitted from a light source on the basis of input second image data and a second projection optical system that projects the spatially modulated light onto a projection surface of the vehicle to display a real image based on the second image data, the method including the steps of: inputting, as the first image data, guidance information including an arrow for guiding a line of sight to the real image displayed by the real image display unit to the first light modulator in a case where the second image data includes warning information for providing a warning to a driver of the vehicle, and inputting, as the second image data, guidance information including an arrow for guiding the line of sight to the virtual image displayed by the virtual image display unit to the second light modulator in a case where the first image data includes the warning information.

According to still another aspect of the invention, there is provided a non-transitory computer readable medium storing a display control program of a projection type display device that is mounted in a vehicle, the projection type display device including a virtual image display unit that includes a first light modulator that spatially modulates light that is emitted from a light source on the basis of input first image data and a first projection optical system that projects the spatially modulated light onto a projection surface of the vehicle to display a virtual image based on the first image data, and a real image display unit that includes a second light modulator that spatially modulates light that is emitted from a light source on the basis of input second image data and a second projection optical system that projects the spatially modulated light onto a projection surface of the vehicle to display a real image based on the second image data, the display control program causing a computer to execute the steps of: inputting, as the first image data, guidance information including an arrow for guiding a line of sight to the real image displayed by the real image display unit to the first light modulator in a case where the second image data includes warning information for providing a warning to a driver of the vehicle, and inputting, as the second image data, guidance information including an arrow for guiding the line of sight to the virtual image displayed by the virtual image display unit to the second light modulator in a case where the first image data includes the warning information.

According to the embodiments of the invention, it is possible to provide a projection type display device, a display control method thereof, and a display control program thereof capable of preventing missing of warning information even in a case where display of warning information using a virtual image and display of warning information using a real image are switched.

BRIEF DESCRIPTION OF THE DRAWINGS

FIG. 5 is a functional block diagram of a main controller that forms the HUD shown in

FIG. 1.

DESCRIPTION OF THE PREFERRED EMBODIMENTS

Figure 1:
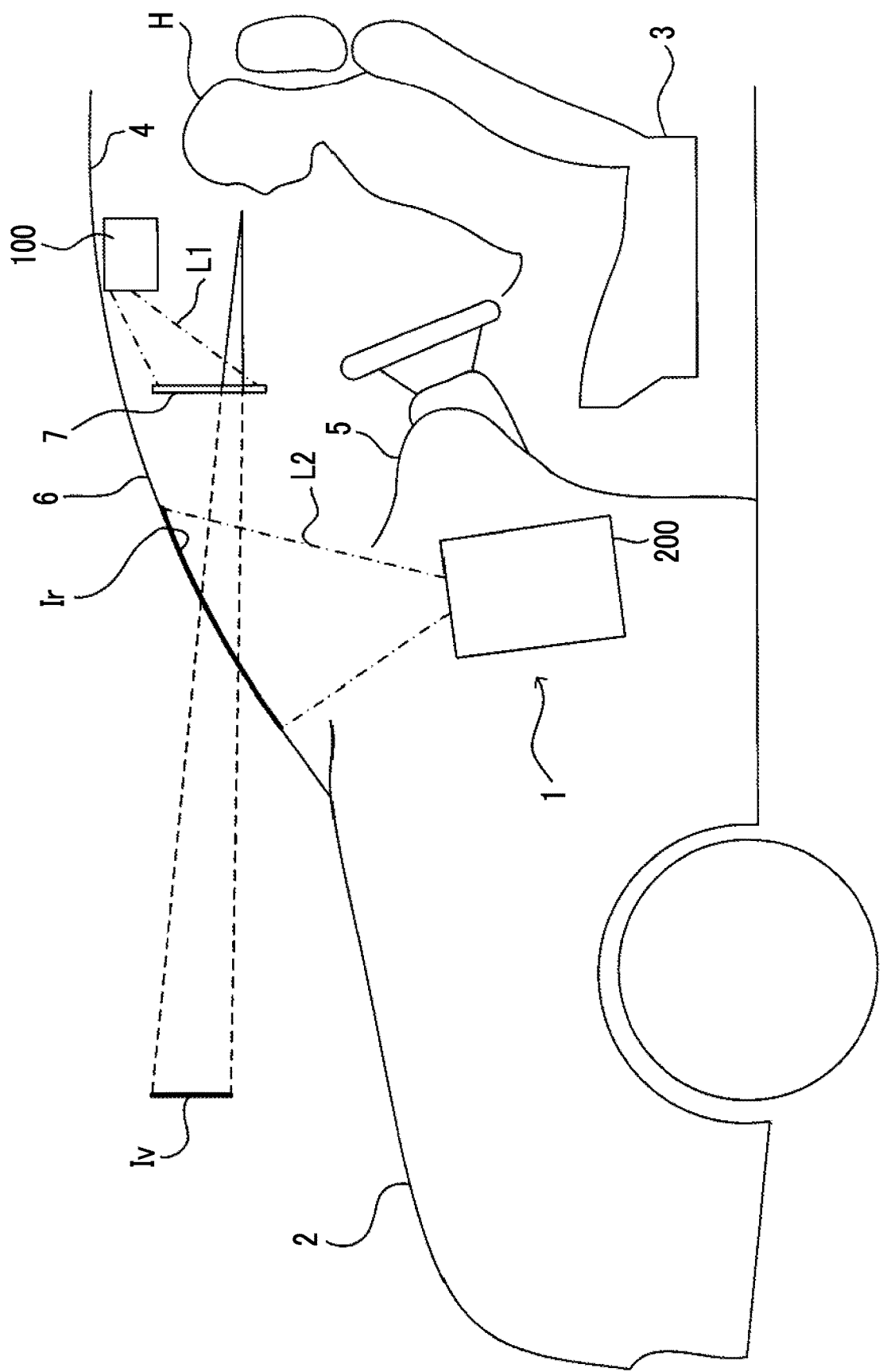
FIG. 1 is a schematic diagram showing a configuration of an automobile 2 in which an HUD 1 that is a projection type display device is mounted, according to an embodiment of the invention.

FIG. 1 is a schematic diagram showing a configuration of an automobile 2 in which an HUD 1 that is a projection type display device is mounted, according to an embodiment of the invention. The HUD 1 may be mounted for use in a vehicle such as a train, heavy equipment, a construction machine, an aircraft, a ship, or an agricultural machine, as well as the automobile.

The HUD 1 shown in FIG. 1 includes a first unit 100 that is disposed above a driver H in a driver's cab in a state where the driver H is seated on a driver's seat 3 of the automobile 2, and a second unit 200 that is disposed in front of the driver H in the driver's cab. In this example, the first unit 100 is provided on a ceiling 4 of a passenger compartment, and the second unit 200 is provided in a dashboard 5.

The first unit 100 projects image light L1 onto a combiner 7 that is provided in the driver's cab so that a virtual image Iv is displayed in front of a windshield 6 of the automobile 2. The first unit 100 forms a virtual image display unit. The second unit 200 projects image light L2 onto the windshield 6 so that a real image Ir is displayed on the windshield 6 of the automobile 2. The second unit 200 forms a real image display unit.

The driver H can recognize information on a picture or characters for assisting an operation of the automobile 2 by viewing the virtual image Iv displayed in front of the windshield 6 and the real image Ir displayed on the windshield 6.

Figure 2:
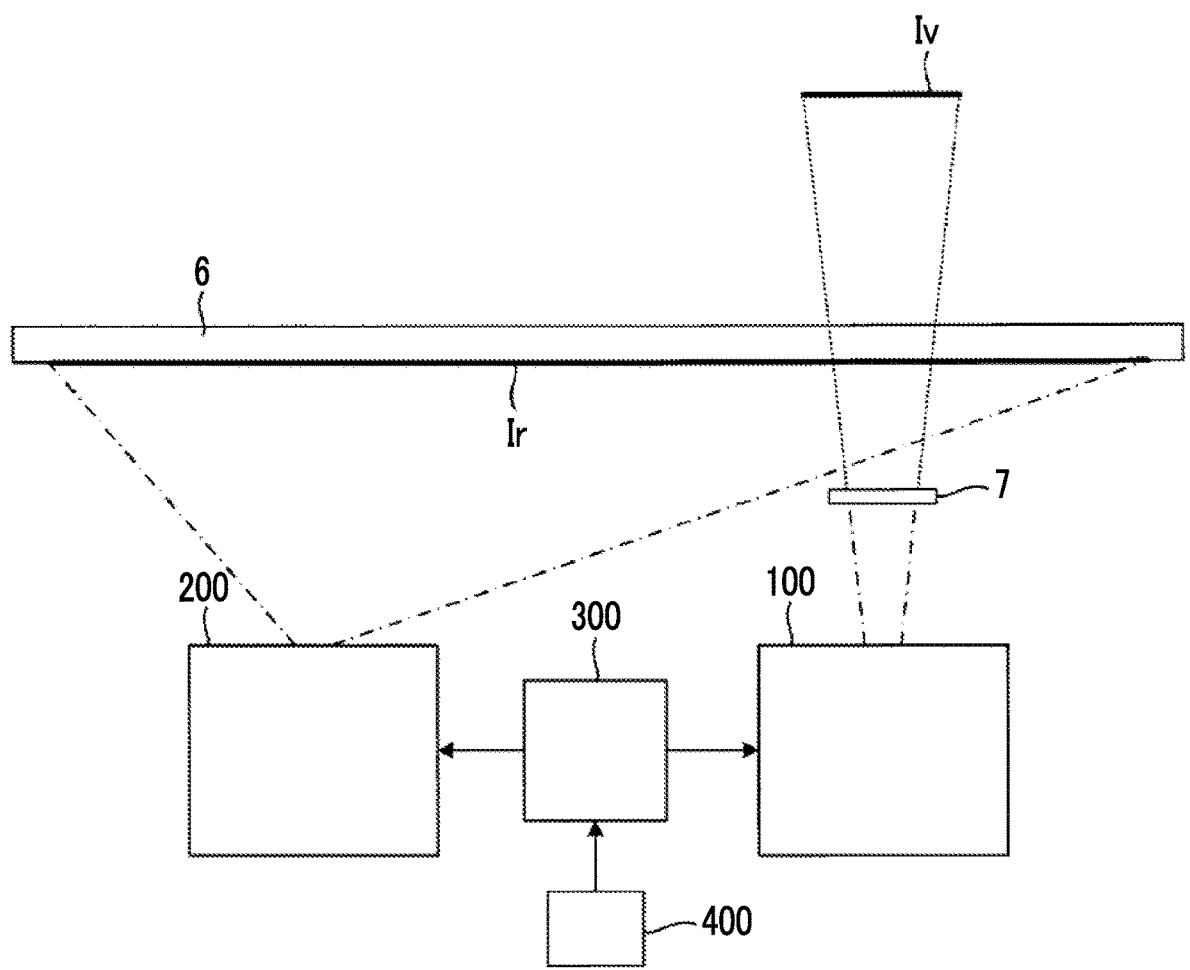
FIG. 2 is a conceptual diagram of the HUD 1 shown in FIG. 1.

FIG. 2 is a conceptual diagram of the HUD 1 shown in FIG. 1.

The first unit 100 and the second unit 200 are all connected to a main controller 300. The main controller 300 generally controls the entirety of the HUD 1, and is configured of a variety of processors. The main controller 300 monitors information on a running speed of the automobile 2 measured by a speedometer 400 all the time, and assigns commands based on occasionally changing running speeds to the first unit 100 and the second unit 200.

The HUD 1 includes the combiner 7. The combiner 7 forms a projection surface onto which light for displaying the virtual image Iv is projected. The combiner 7 is an optical member that causes the driver H to visually recognize the virtual image Iv by partially reflecting the image light L1 to eye points of the driver H when the image light L1 is projected thereto from the first unit 100. The driver H can visually recognize the virtual image Iv based on the image light L1 projected from the first unit 100 in an overlapping manner with an outside scene that is seen through the windshield 6.

Further, the real image Ir may be displayed in a wide range of the windshield 6 using a real image film provided on the windshield 6 as a projection surface of the image light L2. The real image Ir is displayed when entertainment content or the like, in addition to information to be presented to the driver H, is presented to a fellow passenger seated on an assistance driver's seat, for example.

Figure 3:
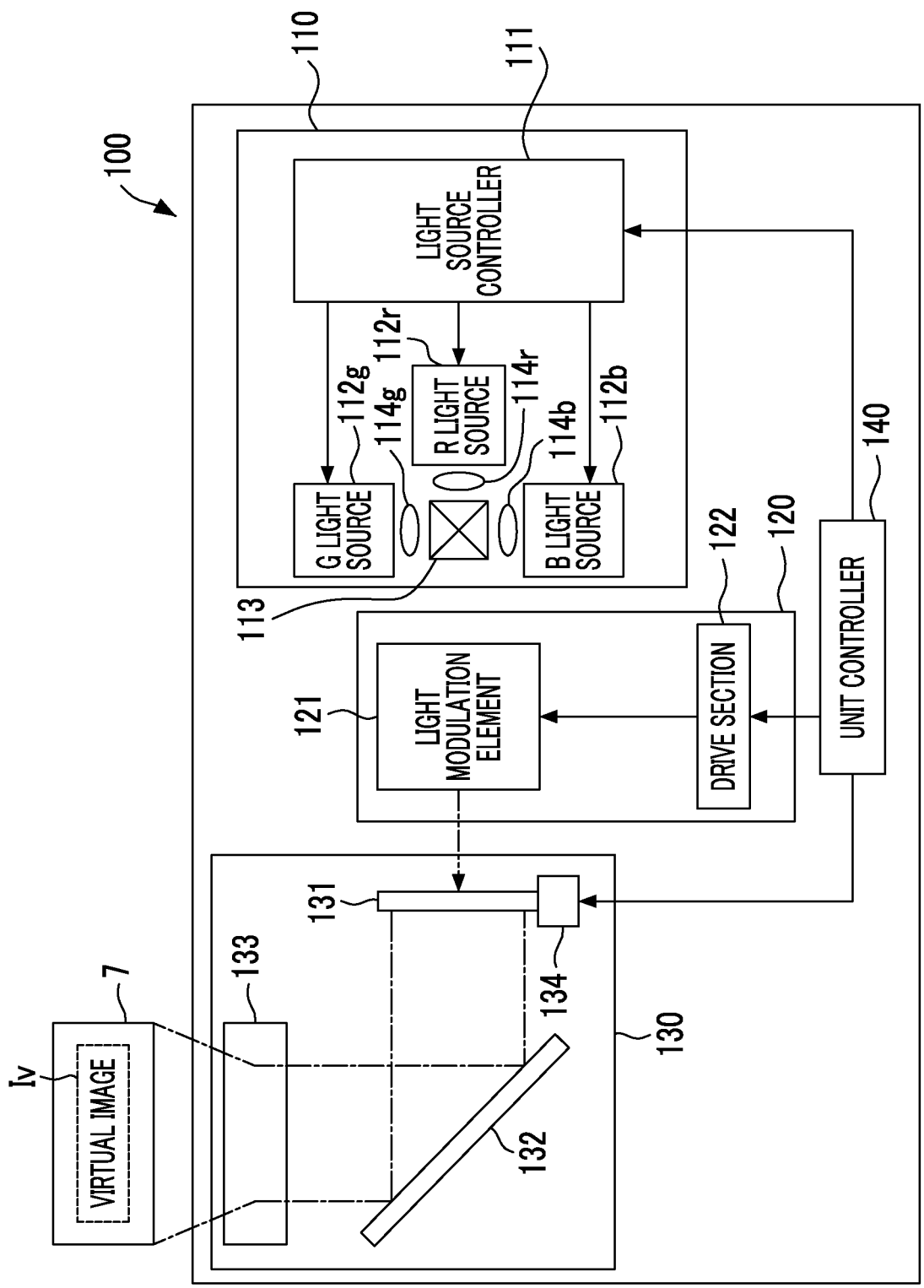
FIG. 3 is a schematic diagram showing an internal configuration of a first unit that forms the HUD shown in FIG. 1.

FIG. 3 is a schematic diagram showing an internal configuration of the first unit 100 that forms the HUD 1.

The first unit 100 includes a light source unit 110, a first light modulator 120, a first projection optical system 130, and a unit controller 140.

The light source unit 110 includes a light source controller 111, an R light source 112r that is a light source that emits red light, a G light source 112g that is a light source that emits green light, a B light source 112b that is a light source that emits blue light, a dichroic prism 113, a collimator lens 114r that is provided between the R light source 112r and the dichroic prism 113, a collimator lens 114g that is provided between the G light source 112g and the dichroic prism 113, and a collimator lens 114b that is provided between the B light source 112b and the dichroic prism 113.

The dichroic prism 113 is an optical member for guiding light emitted from each of the R light source 112r, the G light source 112g, and the B light source 112b to the same optical path. That is, the dichroic prism 113 transmits red light that is collimated by the collimator lens 114r to be output to the first light modulator 120. Further, the dichroic prism 113 reflects green light that is collimated by the collimator lens 114g to be output to the first light modulator 120. In addition, the dichroic prism 113 reflects blue light that is collimated by the collimator lens 114b to be output to the first light modulator 120. An optical member having such a function is not limited to a dichroic prism. For example, a cross dichroic mirror may be used.

The R light source 112r, the G light source 112g, and the B light source 112b may respectively employ a light emitting element such as a laser or a light emitting diode (LED). In this embodiment, the light sources of the light source unit 110 are configured to include three light sources that are the R light source 112r, the G light source 112g, and the B light source 112b, but the number of light sources may be 1, 2, or 4 or more.

The light source controller 111 sets the intensity of light emitted from each of the R light source 112r, the G light source 112g, and the B light source 112b to a predetermined light intensity pattern, and performs a control for sequentially emitting light from the R light source 112r, the G light source 112g, and the B light source 112b according to the light intensity patterns. The light emission control of the R light source 112r, the G light source 112g, and the B light source 112b in the light source controller 111 is performed under the control of the unit controller 140.

The first light modulator 120 includes a light modulation element 121 and a drive section 122.

The light modulation element 121 spatially modulates light that is emitted from the dichroic prism 113, and emits the spatially-modulated light (red color image light, blue color image light, and green color image light) to the first projection optical system 130.

The light modulation element 121 may employ, for example, a liquid crystal on silicon (LCOS), a digital micromirror device (DMD), a micro electro mechanical systems (MEMS) element, a liquid crystal display device, or the like.

The drive section 122 drives the light modulation element 121 on the basis of first image data input from the unit controller 140, and causes light (red color image light, blue color image light, and green color image light) based on the first image data to be output to the first projection optical system 130.

The first projection optical system 130 is an optical system that projects image light that is spatially modulated by the light modulation element 121 onto the combiner 7. The first projection optical system 130 is optically designed so that an image based on the image light projected onto the combiner 7 can be visually recognized by a driver as a virtual image in front of the combiner 7.

In the example of FIG. 3, the first projection optical system 130 includes a diffuser 131, a reflecting mirror 132, a magnifier 133, and a virtual image distance variable mechanism 134.

The image light L1 emitted from the light modulation element 121 of the first light modulator 120 is projected onto the diffuser 131. The diffuser 131 diffuses the projected image light L1 to become a plane light source.

The reflecting mirror 132 reflects the image light L1 diffused by the diffuser 131 to be incident to the magnifier 133.

As the image light L1 that is incident to the magnifier 133 is magnified and projected onto the combiner 7, the virtual image Iv is displayed in front of the windshield 6 of the automobile 2.

The virtual image distance variable mechanism 134 moves the diffuser 131 in an optical axis direction to change the length of an optical path until the image light L1 reaches the combiner 7. As the length of the optical path is changed until the image light L1 reaches the combiner 7, it is possible to change a distance (virtual image distance) from the driver H to the virtual image Iv. An operation control of the virtual image distance variable mechanism 134 is performed under the control of the unit controller 140.

The unit controller 140 generally controls the entirety of the first unit 100, and is configured of a variety of processors. The unit controller 140 executes a variety of control processes in accordance with commands from the main controller 300.

In a case where the unit controller 140 receives an image light projection command from the main controller 300, the unit controller 140 inputs first image data to the drive section 122, and causes the image light L1 based on the first image data to be projected onto the combiner 7. The unit controller 140 controls the first image data to change a virtual image to be displayed. The unit controller 140 functions as a first controller.

Figure 4:
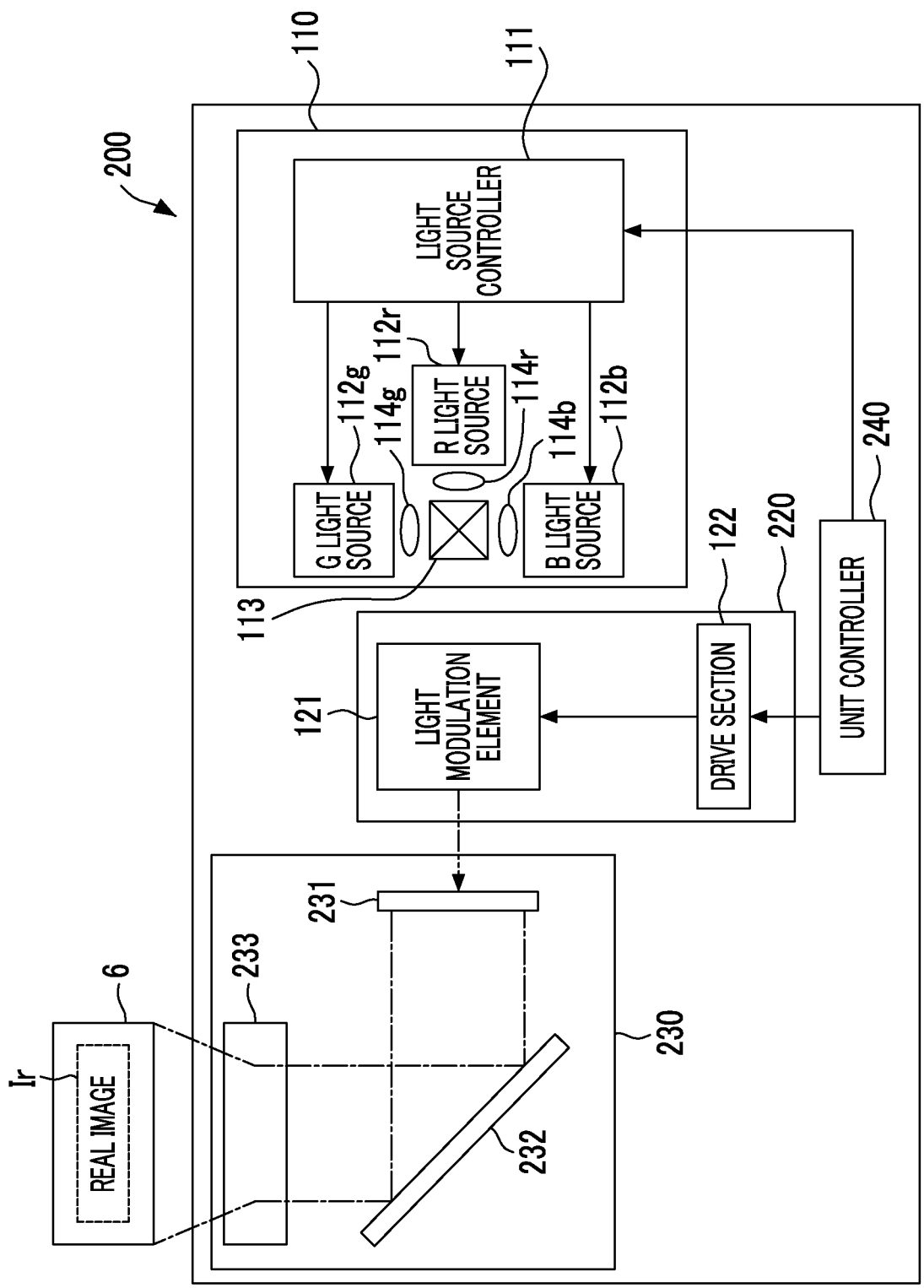
FIG. 4 is a schematic diagram showing an internal configuration of a second unit that forms the HUD shown in FIG. 2.

FIG. 4 is a schematic diagram showing an internal configuration of the second unit 200 that forms the HUD 1 shown in FIG. 1. In FIG. 4, the same components as in FIG. 3 are given to the same reference numerals.

The second unit 200 is configured so that the first light modulator 120 is changed to a second light modulator 220, the first projection optical system 130 is changed to a second projection optical system 230, and the unit controller 140 is changed to a unit controller 240, in the first unit 100 shown in FIG. 3.

The second light modulator 220 has the same configuration as that of the first light modulator 120.

The second projection optical system 230 is an optical system that projects image light that is spatially modulated by the light modulation element 121 of the second light modulator 220 to the windshield 6. The second projection optical system 230 is optically designed so that an image based on the image light projected onto the windshield 6 can be visually recognized by a driver as a real image in the windshield 6.

In the example of FIG. 4, the second projection optical system 230 includes a diffuser 231, a reflecting mirror 232, and a magnifier 233.

The image light L2 emitted from the light modulation element 121 of the second light modulator 220 is projected onto the diffuser 231. The diffuser 231 diffuses the projected image light L2 to become a plane light source.

The reflecting mirror 232 reflects the image light L2 diffused by the diffuser 231 to be incident to the magnifier 233.

As the image light L2 that is incident to the magnifier 233 is magnified and projected onto the windshield 6, the real image Ir is displayed on the windshield 6 of the automobile 2.

The unit controller 240 generally controls the entirety of the second unit 200, and is configured of a variety of processors. The unit controller 240 executes a variety of control processes in accordance with commands from the main controller 300.

In a case where the unit controller 240 receives an image light projection command from the main controller 300, the unit controller 240 inputs second image data to the drive section 122 of the second light modulator 220, and causes the image light L2 based on the second image data to be projected onto the windshield 6. The unit controller 240 controls the second image data to change a real image to be displayed. The unit controller 240 functions as a second controller.

The variety of processors in this specification include a central processing unit (CPU) that is a general-purpose processor that performs a variety of processes by executing a program, a programmable logic device (PLD) that is a processor capable of changing a circuit configuration after manufacturing, such as a field programmable gate array (FPGA), an exclusive electric circuit that is a processor that has a circuit configuration that is exclusively designed for executing a specific process, such as an application specific integrated circuit (ASIC), or the like.

A structure of the variety of processors is, more specifically, an electric circuit in which circuit elements such as semiconductor devices are combined.

A processor that forms each of the main controller 300, the unit controller 140, and the unit controller 240 may be configured as one processor among a variety of processors, or may be configured as a combination of the same kind or different kinds of two or more processors (for example, a combination of a plurality of FPGAs or a combination of a CPU and a FPGA).

Figure 5:
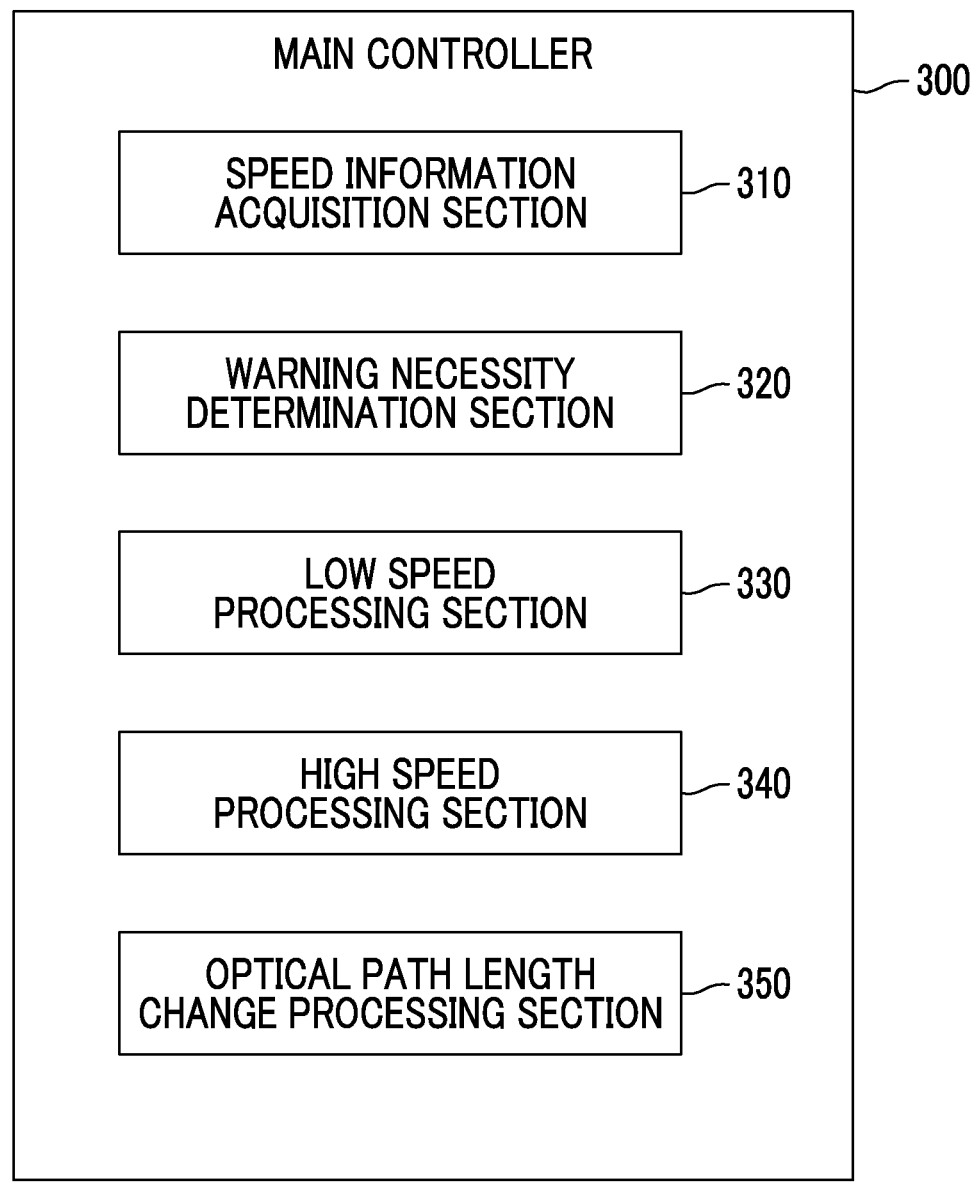

FIG. 5 is a functional block diagram of the main controller 300.

The main controller 300 functions as a speed information acquisition section 310, a warning necessity determination section 320, a low speed processing section 330, a high speed processing section 340, and an optical path length change command section 350.

The main controller 300 is configured of the above-described various processors, and further includes a read only memory (ROM) in which a program or the like for executing the processors is stored, a random access memory (RAM) that is a work memory, or the like.

The speed information acquisition section 310, the warning necessity determination section 320, the low speed processing section 330, the high speed processing section 340, and the optical path length change command section 350 are configured as the processor of the main controller 300 executes a program stored in the ROM of the main controller 300. The program includes a display control program.

The speed information acquisition section 310 is a functional block that acquires information on the running speed of the automobile 2 from the speedometer 400.

The warning necessity determination section 320 is a functional block that determines whether it is necessary to provide a warning to the driver H of the automobile 2.

The warning necessity determination section 320 acquires, from an automobile controller (not shown) that generally controls the entirety of a system of the automobile 2, information indicating an abnormality of meters mounted in the automobile 2, information detected by a sensor (not shown) (an ultrasound radar, a millimeter wave radar, a laser radar, a stereo camera, or the like) mounted in the automobile 2, information indicating the presence or absence of malfunction of the sensor, or status information such as captured image data on a front side or a back side of the automobile 2 obtained by imaging using an imaging unit (not shown) mounted in a car body of the automobile 2.

The warning necessity determination section 320 determines whether it is necessary to provide a warning to a driver (person who is sitting on the driver's seat) of the automobile 2 on the basis of the status information.

Cases where the warning necessity determination section 320 determines that it is necessary to provide the warning the driver are as follows, but are not limited thereto.

(1) The warning necessity determination section 320 analyzes information measured by the sensor, and as a result of the analysis, determines that a warning is necessary in a case where an obstacle such as a person or a vehicle is crossing in front of the automobile 2.

(2) The warning necessity determination section 320 analyzes information measured by the sensor mounted in the automobile 2, and as a result of the analysis, determines that a warning is necessary in a case where a distance between the automobile 2 and the obstacle is equal to or shorter than a threshold.

(3) The warning necessity determination section 320 determines that a warning is necessary in a case where malfunction of the sensor necessary for driving is detected.

(4) The warning necessity determination section 320 determines that a warning is necessary in a case where there is an abnormality in meters of the automobile 2.

In the above-described example, the warning necessity determination section 320 analyzes status information and determines whether a warning is necessary. However, an automobile controller that generally controls the automobile 2 may perform the analysis.

In this case, in a case where it is determined that the warning is necessary as a result of the analysis, the automobile controller inputs warning necessity information indicating that the warning is necessary to the main controller 300. Further, the warning necessity determination section 320 acquires the warning necessity information input from the automobile controller, and recognizes that the warning is necessary on the basis of the warning necessity information.

The low speed processing section 330 is a functional block that assigns, in a case where the running speed of the automobile 2 acquired by the speed information acquisition section 310 is equal to or lower than a threshold TH and it is determined that it is necessary to provide a warning the driver H of the automobile 2, a projection command of the image light L2 based on the second image data including warning information to the unit controller 240 of the second unit 200, and assigns a projection command of the image light L1 based on the first image data including guidance information for guiding a line of sight to the real image Ir displayed by the second unit 200 to the unit controller 140 of the first unit 100.

The high speed processing section 340 is a functional block that assigns, in a case where the running speed of the automobile 2 acquired by the speed information acquisition section 310 exceeds the threshold TH and it is determined that it is necessary to provide a warning to the driver H of the automobile 2, a projection command of the image light L1 based on the first image data including warning information to the unit controller 140 of the first unit 100, and assigns a projection command of the image light L2 based on the second image data including guidance information for guiding a line of sight to the virtual image Iv displayed by the first unit 100 to the unit controller 240 of the second unit 200.

The warning information represents information for providing a warning to the driver H, and specifically, may be information for notifying the presence of an obstacle such as a person or another vehicle, information for notifying an approach to an obstacle, information for notifying malfunction of the sensor or meters, information for notifying driving-too-fast, or the like.

The optical path length change command section 350 is a functional block that assigns a command for changing the length of the optical path until the image light L1 reaches the combiner 7, according to whether the running speed of the automobile 2 acquired by the speed information acquisition section 310 exceeds the threshold TH, to the unit controller 140 of the first unit 100.

In a case where the running speed of the automobile 2 exceeds the threshold TH, the optical path length change command section 350 assigns a command for controlling the length of the optical path to a first value, and in a case where the running speed of the automobile 2 is equal to or lower than the threshold TH, the optical path length change command section 350 assigns a command for controlling the length of the optical path to a second value that is shorter than the first value.

A virtual image distance when the length of the optical path is controlled to the first value becomes the longest distance Dmax, and a virtual image distance when the length of the optical path is controlled to the second value becomes the shortest distance Dmin.

Then, an operation of the HUD 1 shown in FIG. 1 will be described with reference to FIGS. 6 to 9.

Figure 6:
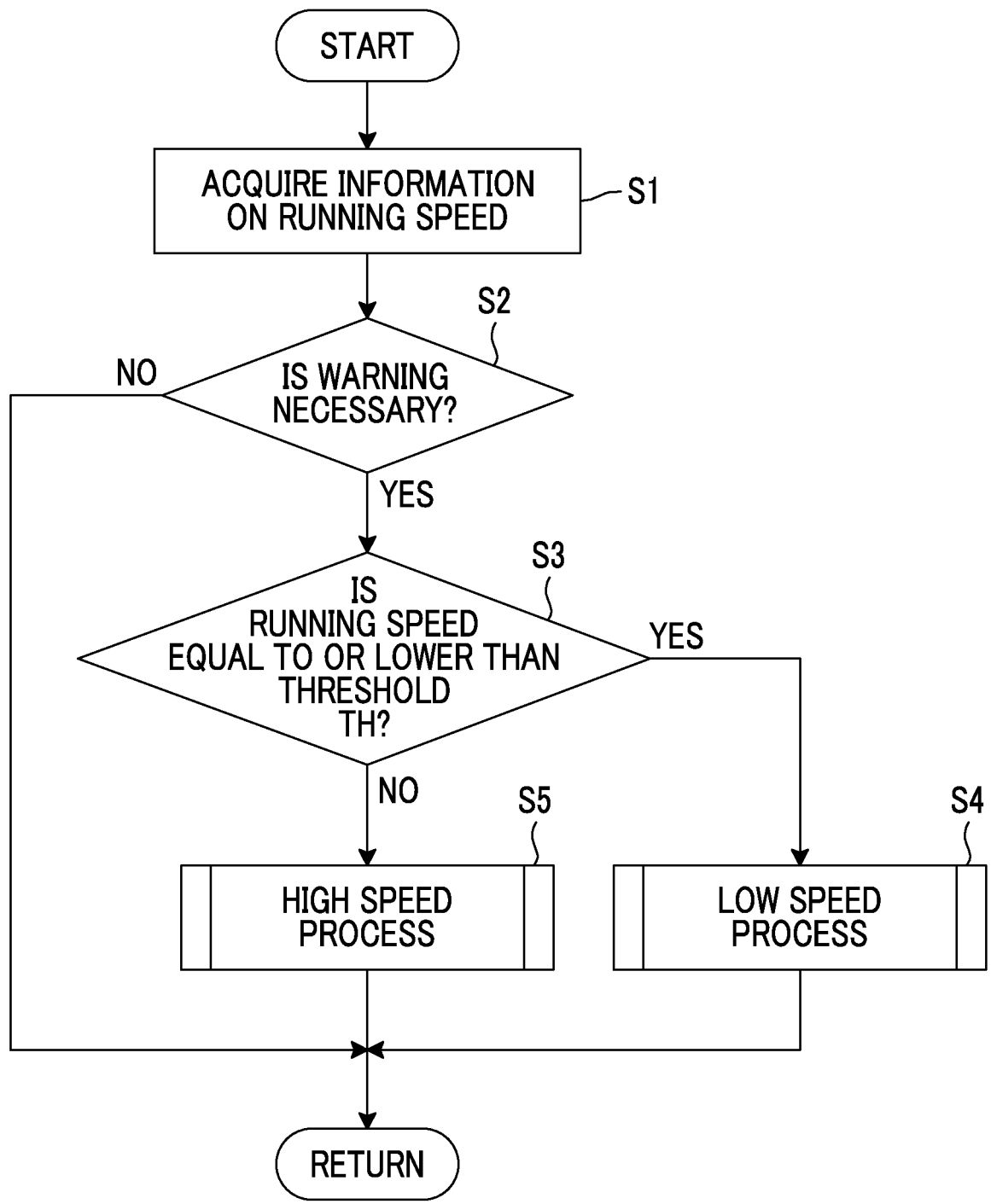
FIG. 6 is a flowchart showing content of a process in the main controller shown in FIG. 5.

FIG. 6 is a flowchart showing content of a process in the main controller 300.

In a case where the HUD 1 is started, the main controller 300 acquires information on the running speed of the automobile 2 on the basis of a measurement signal of the speedometer 400 (step S1). Further, the main controller 300 determines whether it is necessary to provide a warning to the driver H of the automobile 2 (step S2). As a result of the determination, in a case where it is not necessary to provide the warning (NO in step S2), the procedure returns to step S1.

In a case where it is necessary to provide the warning (YES in step S2), the main controller 300 determines whether the running speed of the automobile 2 is equal to or lower than the threshold TH (step S3). In a case where the running speed of the automobile 2 is equal to or lower than the threshold TH (YES in step S3), the procedure proceeds to a low speed process (step S4). In a case where the running speed of the automobile 2 exceeds the threshold TH (NO in step S3), the procedure proceeds to a high speed process (step S5).

Figure 7:
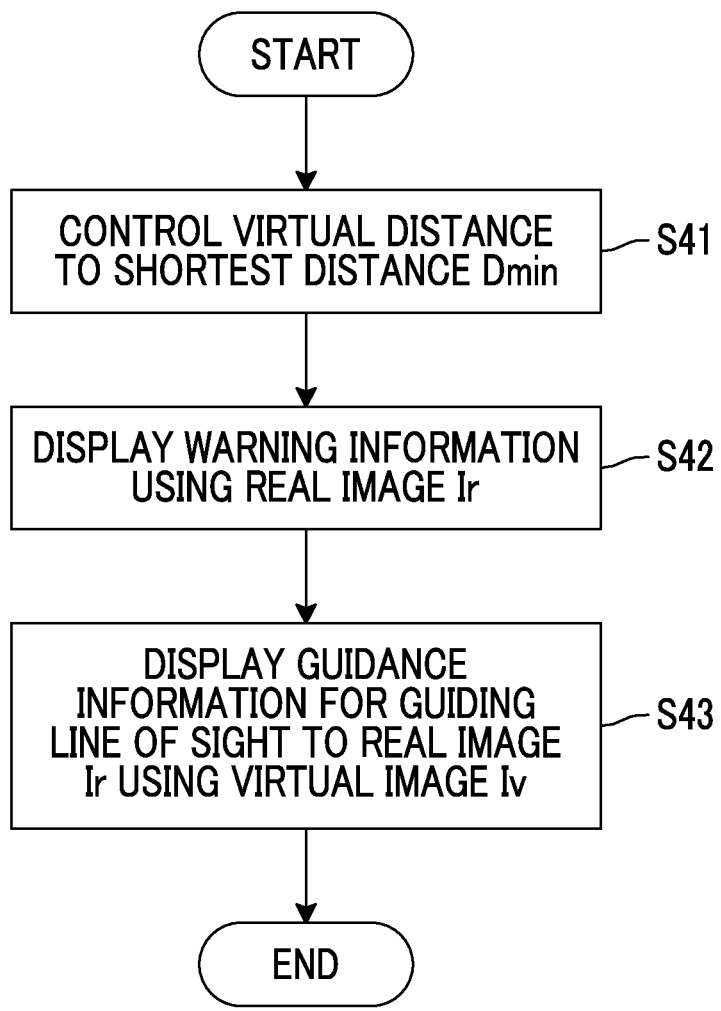
FIG. 7 is a flowchart showing details of step S4 in FIG. 6.

FIG. 7 is a flowchart showing details of step S4 in FIG. 6.

In a case where the low speed process (step S4) is started, the main controller 300 assigns the command for controlling the length of the optical path to the second value to the unit controller 140 of the first unit 100, and controls the virtual image distance to the shortest distance Dmin (step S41).

Then, the main controller 300 assigns a command to the unit controller 240 of the second unit 200 to cause second image data including warning information to be input to the drive section 122, and causes the warning information to be displayed using the real image Ir (step S42).

In a case where information that is not urgent, such as entertainment content, is being displayed using the real image Ir, the main controller 300 terminates the display of the information that is not urgent, and then, displays the warning information using the real image Ir.

Further, the main controller 300 assigns a command to the unit controller 140 of the first unit 100 to cause first image data including guidance information for guiding a line of sight of the driver H to the real image Ir to be input to the drive section 122, and displays the guidance information using the virtual image Iv (step S43).

Figure 9:
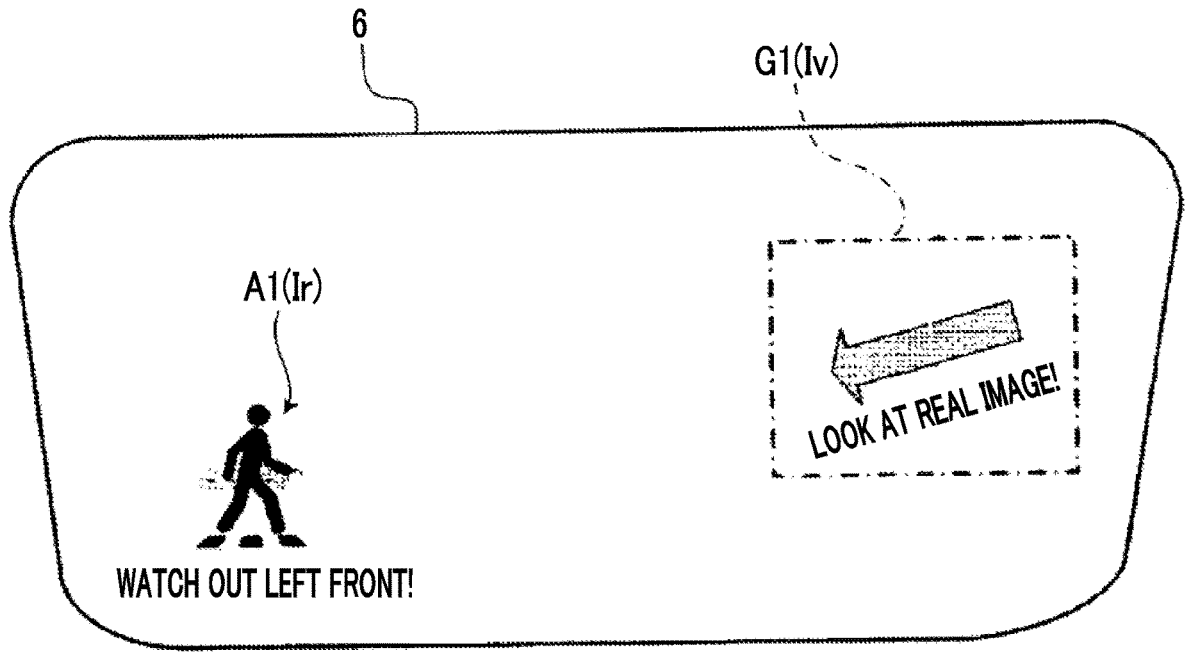
FIG. 9 is a schematic diagram showing display statuses of a virtual image and a real image in execution of a low speed process.

As the low speed process (step S4) is executed, as shown in FIG. 9, warning information A1 is displayed on the windshield 6 using the real image Ir, and guidance information G1 is displayed in front of the windshield 6 using the virtual image Iv.

Figure 8:
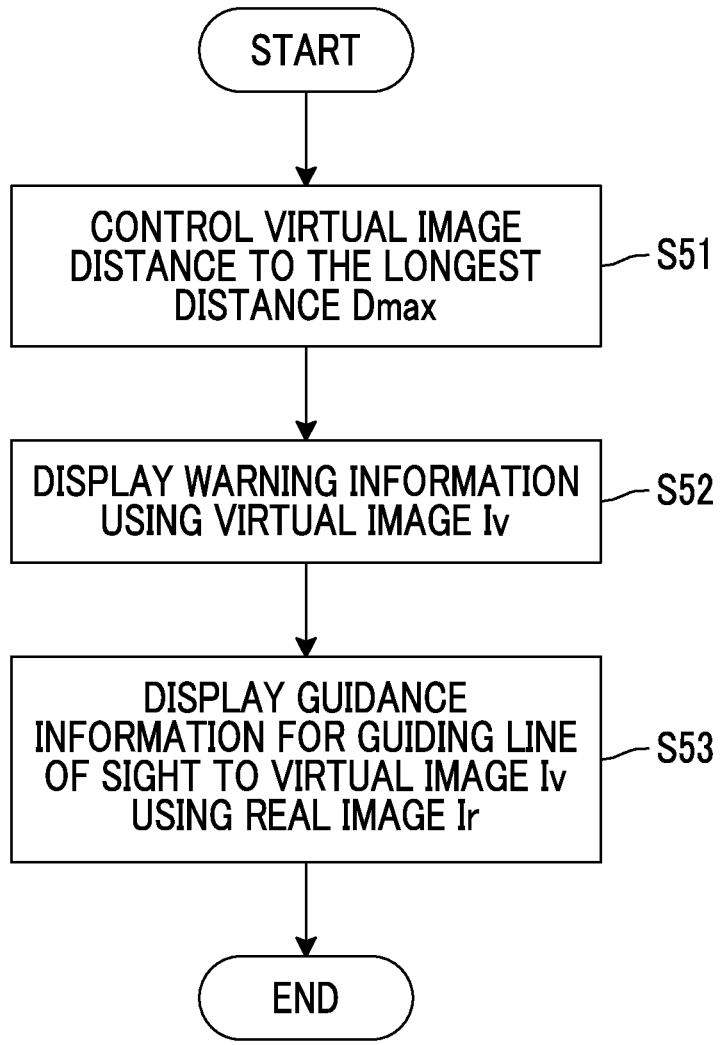
FIG. 8 is a flowchart showing details of step S5 in FIG. 6.

FIG. 8 is a flowchart showing details of step S5 in FIG. 6.

In a case where the high speed process (step S5) is started, the main controller 300 assigns the command for controlling the length of the optical path to the first value to the unit controller 140 of the first unit 100, and controls the virtual image distance to the longest distance Dmax (step S51).

Then, the main controller 300 assigns a command to the unit controller 140 of the first unit 100 to cause first image data including warning information to be input to the drive section 122, and displays the warning information using the virtual image Iv (step S52).

Further, the main controller 300 assigns a command to the unit controller 240 of the second unit 200 to cause second image data including guidance information for guiding a line of sight of the driver H to the virtual image Iv to be input to the drive section 122, and displays the guidance information using the real image Ir (step S53).

In a case where information that is not urgent, such as entertainment content, is being displayed using the real image Ir, the main controller 300 terminates the display of the information that is not urgent, and then, displays the guidance information using the real image Ir.

Figure 10:
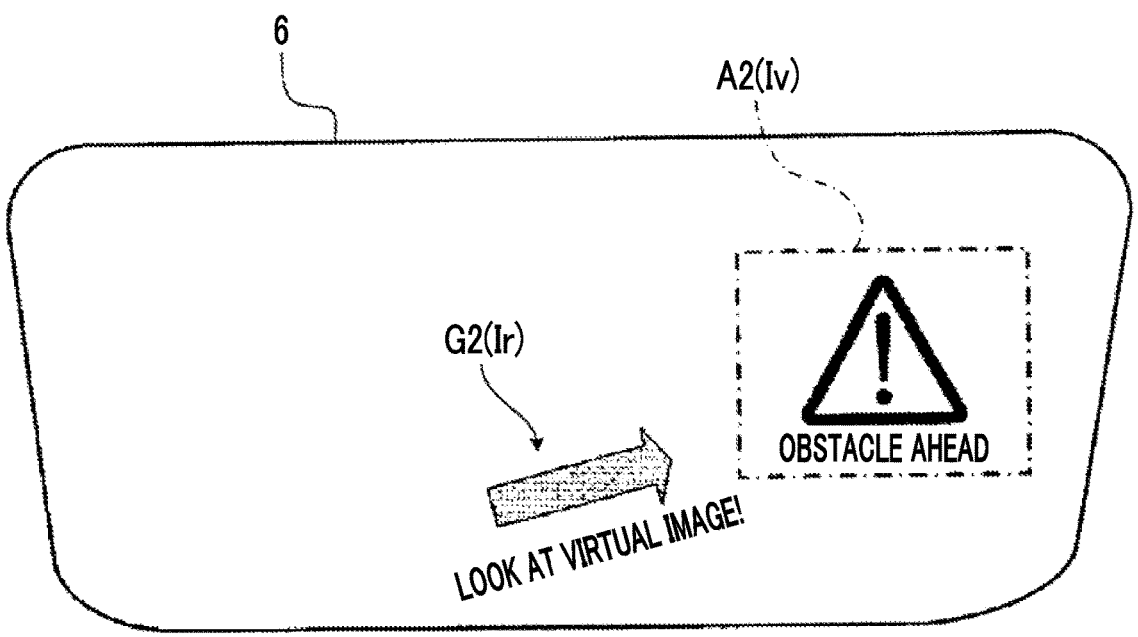
FIG. 10 is a schematic diagram showing display statuses of a virtual image and a real image in execution of a high speed process.

As the high speed process (step S5) is executed, as shown in FIG. 10, warning information A2 is displayed in front of the windshield 6 using the virtual image Iv, and guidance information G2 is displayed on the windshield 6 using the real image Ir.

As described above, according to the HUD 1, when the automobile 2 is running at a low speed, in a case where it is necessary to provide a warning to the driver H, the warning information A1 is displayed on the windshield 6 using the real image Ir, and at the same time, the guidance information G1 is displayed in front of the windshield 6 using the virtual image Iv. Accordingly, it is possible to easily make the driver H recognize that the warning information A1 is displayed using the real image Ir, using the guidance information.

During the low speed run, the automobile is usually running on a city area, and there is a warning cause at a close area of the automobile 2, for example, due to sudden jumping in of a person, a bicycle, or the like. Accordingly, by displaying the warning information A1 using the real image Ir capable of being displayed in a wide range and displayed on the windshield 6 that is relatively close to a focus of the eyes of the driver H during the low speed run, it is possible to effectively perform driving assistance.

On the other hand, while the automobile 2 is running at a high speed, in a case where it is necessary to provide a warning to the driver H, the warning information A2 is displayed in front of the windshield 6 using the virtual image Iv, and at the same time, the guidance information G2 is displayed on the windshield 6 using the real image Ir. Accordingly, it is possible to make the driver H recognize that the warning information A2 is displayed using the virtual image Iv, using the guidance information G2.

During the high speed run, there is a warning cause at a distant area of the automobile 2, and it is preferable that a focus of eyes of the driver H is in a relatively distant area. Accordingly, by displaying the warning information A2 using the virtual image Iv displayed in front of the windshield 6, it is possible to effectively perform driving assistance.

In this way, by displaying the guidance information G2 using the virtual image Iv when the warning information A1 is displayed using the real image Ir, and displaying the guidance information G2 using the real image Ir when the warning information A2 is displayed using the virtual image Iv, even in a case where the display of the warning information A2 using the virtual image Iv and the display of the warning information A1 using the real image Ir are switched, it is possible to prevent missing of both the warning information A1 and A2.

Further, while the automobile 2 is running at the low speed, the virtual image Iv is displayed at a position of the shortest distance Dmin, and while the automobile 2 is running at the high speed, the virtual image Iv is displayed at a position of the longest distance Dmax. Accordingly, even in any status of the low speed run and the high speed run, it is possible to display the guidance information G1 or the warning information A2 using the virtual image Iv at a position close to the focus of the eyes of the driver H in front of the windshield 6, to thereby enhance visibility of information.

The invention is not limited to the above-described embodiment.

For example, the HUD 1 has a configuration in which the image light L1 is projected onto the combiner 7 from the first unit 100 to display the virtual image Iv in front of the windshield 6, but may have a configuration in which the combiner 7 is not provided, the image light L1 is projected onto the windshield 6 from the first unit 100, and thus, the virtual image Iv is displayed in front of the windshield 6.

In this case, it is preferable to take measures, such as a step of cutting off a real image display film provided on the windshield 6 or a step of cutting a wavelength that reacts with the real image display film among wavelengths included in the image light L1, in advance, with respect to a projection area of the image light L1 from the first unit 100 so that visibility of the virtual image Iv does not deteriorate due to the real image Ir displayed in front of the windshield 6.

Further, the HUD 1 has a configuration in which the first unit 100 and the second unit 200 respectively include the unit controllers 140 and 240 that are operated under the control of the main controller 300, but may have a configuration in which one or both functions of the unit controllers 140 and 240 are given to the main controller 300 and one or both of the unit controllers 140 and 240 are not provided. In this case, the main controller 300 functions as one or both of the first controller and the second controller.

Further, in the first unit 100 of the HUD 1, a configuration in which the diffuser 131 of the first projection optical system 130 is moved to change the length of the optical path of the image light L1 is shown, but a configuration in which another optical element is moved to change the length of the optical path of the image light L1 or a configuration in which the light modulation element 121 is moved to change the length of the optical path of the image light L1 may be used. Further, a mechanism for making the length of the optical path of the image light L1 variable is not essential, and thus, a configuration in which the virtual image distance variable mechanism 134 is not provided may be used.

As described above, the following configurations are disclosed in this specification.

(1) A projection type display device that is mounted in a vehicle, including: a virtual image display unit that includes a first light modulator that spatially modulates light that is emitted from a light source on the basis of input first image data and a first projection optical system that projects the spatially modulated light onto a projection surface of the vehicle to display a virtual image based on the first image data; a real image display unit that includes a second light modulator that spatially modulates light that is emitted from a light source on the basis of input second image data and a second projection optical system that projects the spatially modulated light onto a projection surface of the vehicle to display a real image based on the second image data; a first controller that controls the first image data to be input to the first light modulator; and a second controller that controls the second image data to be input to the second light modulator, wherein the first controller inputs the first image data including guidance information for guiding a line of sight to the real image displayed by the real image display unit to the first light modulator, in a case where the second image data includes warning information for providing a warning to a driver of the vehicle, and wherein the second controller inputs the second image data including guidance information for guiding the line of sight to the virtual image displayed by the virtual image display unit to the second light modulator, in a case where the first image data includes the warning information.

(2) The projection type display device according to (1), further including: a running speed information acquisition section that acquires information on a running speed of the vehicle; and a warning necessity determination section that determines whether it is necessary to provide a warning to the driver of the vehicle, wherein in a case where it is determined that the warning is necessary in a situation where the running speed exceeds a threshold, the first controller inputs the first image data including the warning information to the first light modulator.

(3) The projection type display device according to (1), further including: a running speed information acquisition section that acquires information on a running speed of the vehicle; and a warning necessity determination section that determines whether it is necessary to provide a warning to the driver of the vehicle, wherein in a case where it is determined that the warning is necessary in a situation where the running speed is equal to or lower than a threshold, the second controller inputs the second image data including the warning information to the second light modulator.

(4) In the projection type display device according to (2) or (3), the virtual image display unit is capable of changing a length of an optical path of the light until the light reaches the projection surface, and in a case where the running speed exceeds the threshold, the length of the optical path is controlled to a first value, and in a case where the running speed is equal to or lower than the threshold, the length of the optical path is controlled to a second value that is shorter than the first value.

(5) A display control method of a projection type display device that is mounted in a vehicle, the projection type display device including a virtual image display unit that includes a first light modulator that spatially modulates light that is emitted from a light source on the basis of input first image data and a first projection optical system that projects the spatially modulated light onto a projection surface of the vehicle to display a virtual image based on the first image data, and a real image display unit that includes a second light modulator that spatially modulates light that is emitted from a light source on the basis of input second image data and a second projection optical system that projects the spatially modulated light onto a projection surface of the vehicle to display a real image based on the second image data, the method including the steps of: inputting the first image data including guidance information for guiding a line of sight to the real image displayed by the real image display unit to the first light modulator in a case where the second image data includes warning information for providing a warning to a driver of the vehicle, and inputting the second image data including guidance information for guiding the line of sight to the virtual image displayed by the virtual image display unit to the second light modulator in a case where the first image data includes the warning information.

(6) In the display control method of the projection type display device according to (5), further including: a running speed information acquisition step of acquiring information on the running speed of the vehicle; and a warning necessity determination step of determining whether it is necessary to provide a warning to the driver of the vehicle, wherein in a case where it is determined that the warning is necessary in a situation where the running speed exceeds a threshold, the first image data including the warning information is input to the first light modulator.

(7) The display control method of the projection type display device according to claim (5), further including: a running speed information acquisition step of acquiring information on the running speed of the vehicle; and a warning necessity determination step of determining whether it is necessary to provide a warning to the driver of the vehicle, wherein in a case where it is determined that the warning is necessary in a situation where the running speed is equal to or lower than a threshold, the second image data including the warning information is input to the second light modulator.

(8) In the display control method of the projection type display device according to (6) or (7), the first projection optical system of the virtual image display unit is capable of changing a length of an optical path of the light until the light reaches the projection surface, and in a case where the running speed exceeds the threshold, the length of the optical path is controlled to a first value, and in a case where the running speed is equal to or lower than the threshold, the length of the optical path is controlled to a second value that is shorter than the first value.

(9) A display control program of a projection type display device that is mounted in a vehicle, the projection type display device including a virtual image display unit that includes a first light modulator that spatially modulates light that is emitted from a light source on the basis of input first image data and a first projection optical system that projects the spatially modulated light onto a projection surface of the vehicle to display a virtual image based on the first image data, and a real image display unit that includes a second light modulator that spatially modulates light that is emitted from a light source on the basis of input second image data and a second projection optical system that projects the spatially modulated light onto a projection surface of the vehicle to display a real image based on the second image data, the program causing a computer to execute the steps of: inputting the first image data including guidance information for guiding a line of sight to the real image displayed by the real image display unit to the first light modulator in a case where the second image data includes warning information for providing a warning to a driver of the vehicle, and inputting the second image data including guidance information for guiding the line of sight to the virtual image displayed by the virtual image display unit to the second light modulator in a case where the first image data includes the warning information.

According to the invention, by applying the invention to a vehicle such as an automobile, it is possible to enhance a utility value of the vehicle.

As described above, specific embodiments of the invention have been described, but the invention is not limited to the embodiments, and various modifications are possible in a range without departing from the technical field of the disclosed invention.

Priority is claimed to Japanese Patent Application No. 2016-198340, filed Oct. 6, 2016, the entire content of which is incorporated herein by reference.

EXPLANATION OF REFERENCES

1: HUD
2: automobile
3: driver's seat
4: ceiling
5: dashboard
6: windshield
7: combiner
100: first unit
110: light source unit
112*r*: R light source
112*g*: G light source
112*b*: B light source
113: dichroic prism
114*r*, 114*g*, 114*b*: collimator lens
120: first light modulator
121: light modulation element
122: drive section
130: first projection optical system
131: diffuser
132: reflecting mirror
133: magnifier 134: virtual image distance variable mechanism
140: unit controller
200: second unit
230: second projection optical system
231: diffuser
232: reflecting mirror
233: magnifier
240: unit controller
300: main controller
310: speed information acquisition section
320: warning necessity determination section
330: low speed processing section
340: high speed processing section
350: optical path length change command section
400: speedometer
H: driver
Ir: real image
Iv: virtual image
L1: image light
L2: image light
A1: warning information
A2: warning information
G1: guidance information
G2: guidance information

What is claimed is:

1. A projection type display device that is mounted in a vehicle, comprising:
a virtual image display unit that includes a first light modulator that spatially modulates light that is emitted from a light source on the basis of input first image data and a first projection optical system that projects the spatially modulated light onto a projection surface of the vehicle to display a virtual image based on the first image data;
a real image display unit that includes a second light modulator that spatially modulates light that is emitted from a light source on the basis of input second image data and a second projection optical system that projects the spatially modulated light onto a projection surface of the vehicle to display a real image based on the second image data;
a first controller that controls the first image data to be input to the first light modulator; and
a second controller that controls the second image data to be input to the second light modulator,
wherein the first controller inputs, as the first image data, guidance information including an arrow for guiding a sight of a driver to the real image displayed by the real image display unit to the first light modulator, in a case where the second image data includes warning information for providing a warning to the driver of the vehicle, and
wherein the second controller inputs, as the second image data, guidance information including an arrow for guiding the sight of the driver to the virtual mage displayed by the virtual image display unit to the second light modulator, in a case where the first image data includes the warning information.

2. The projection type display device according to claim 1, further comprising:
a running speed information acquisition section that acquires information on a running speed of the vehicle; and
a warning necessity determination section that determines whether it is necessary to provide a warning to the driver of the vehicle,
wherein in a case where it is determined that the warning is necessary in a situation where the running speed exceeds a threshold, the first controller inputs the first image data including the warning information to the first light modulator.

3. The projection type display device according to claim 2,
wherein the virtual image display unit is capable of changing a length of an optical path of the light until the light reaches the projection surface, and
wherein, in a case where the running speed exceeds the threshold, the length of the optical path is controlled to a first value, and in a case where the running speed is equal to or lower than the threshold, the length of the optical path is controlled to a second value that is shorter than the first value.

4. The projection type display device according to claim 1, further comprising:
a running speed information acquisition section that acquires information on a running speed of the vehicle; and
a warning necessity determination section that determines whether it is necessary to provide a warning to the driver of the vehicle,
wherein in a case where it is determined that the warning is necessary in a situation where the running speed is equal to or lower than a threshold, the second controller inputs the second image data including the warning information to the second light modulator.

5. The projection type display device according to claim 4,
wherein the virtual image display unit is capable of changing a length of an optical path of the light until the light reaches the projection surface, and
wherein, in a case where the running speed exceeds the threshold, the length of the optical path is controlled to a first value, and in a case where the running speed is equal to or lower than the threshold, the length of the optical path is controlled to a second value that is shorter than the first value.

6. The projection type display device according to claim 1, wherein the virtual image is displayed at a more distant position than the real image with respect to the driver.

7. A display control method of a projection type display device that is mounted in a vehicle,
the projection type display device including a virtual image display unit that includes a first light modulator that spatially modulates light that is emitted from a light source on the basis of input first image data and a first projection optical system that projects the spatially modulated light onto a projection surface of the vehicle to display a virtual image based on the first image data, and a real image display unit that includes a second light modulator that spatially modulates light that is emitted from a light source on the basis of input second image data and a second projection optical system that projects the spatially modulated light onto a projection surface of the vehicle to display a real image based on the second image data,
the method comprising the steps of:
inputting, as the first image data, guidance information including an arrow for guiding a sight of a driver to the real image displayed by the real image display unit to the first light modulator in a case where the second image data includes warning information for providing a warning to the driver of the vehicle, and inputting, as the second image data, guidance information including an arrow for guiding the line of sight of the driver to the virtual image displayed by the virtual image display unit to the second light modulator in a case where the first image data includes the warning information.

8. The display control method of the projection type display device according to claim 7, further comprising:
a running speed information acquisition step of acquiring information on a running speed of the vehicle; and
a warning necessity determination step of determining whether it is necessary to provide a warning to the driver of the vehicle,
wherein, in a case where it is determined that the warning is necessary in a situation where the running speed exceeds a threshold, the first image data including the warning information is input to the first light modulator.

9. The display control method of the projection type display device according to claim 8,
wherein the first projection optical system of the virtual image display unit is capable of changing a length of an optical path of the light until the light reaches the projection surface, and
wherein, in a case where the running speed exceeds the threshold, the length of the optical path is controlled to a first value, and in a case where the running speed is equal to or lower than the threshold, the length of the optical path is controlled to a second value that is shorter than the first value.

10. The display control method of the projection type display device according to claim 7, further comprising:
a running speed information acquisition step of acquiring information on a running speed of the vehicle; and
a warning necessity determination step of determining whether it is necessary to provide a warning to the driver of the vehicle,
wherein, in a case where it is determined that the warning is necessary in a situation where the running speed is equal to or lower than a threshold, the second image data including the warning information is input to the second light modulator.

11. The display control method of the projection type display device according to claim 10,
wherein the first projection optical system of the virtual image display unit is capable of changing a length of an optical path of the light until the light reaches the projection surface, and
wherein, in a case where the running speed exceeds the threshold, the length of the optical path is controlled to a first value, and in a case where the running speed is equal to or lower than the threshold, the length of the optical path is controlled to a second value that is shorter than the first value.

12. A non-transitory computer readable medium storing a display control program of a projection type display device that is mounted in a vehicle,
the projection type display device including a virtual image display unit that includes a first light modulator that spatially modulates light that is emitted from a light source on the basis of input first image data and a first projection optical system that projects the spatially modulated light onto a projection surface of the vehicle to display a virtual image based on the first image data, and a real image display unit that includes a second light modulator that spatially modulates light that is emitted from a light source on the basis of input second image data and a second projection optical system that projects the spatially modulated light onto a projection surface of the vehicle to display a real image based on the second image data,
the display control program causing a computer to execute the steps of:
inputting, as the first image data, guidance information including an arrow for guiding a sight of a driver to the real image displayed by the real image display unit to the first light modulator in a case where the second image data includes warning information for providing a warning to the driver of the vehicle, and inputting, as the second image data, guidance information including an arrow for guiding the sight of the driver to the virtual image displayed by the virtual image display unit to the second light modulator in a case where the first image data includes the warning information.

* * * * *